US009378039B2

(12) United States Patent
Bloom et al.

(10) Patent No.: US 9,378,039 B2
(45) Date of Patent: Jun. 28, 2016

(54) VIRTUAL MACHINE STORAGE REPLICATION SCHEMES

(71) Applicant: Verizon Patent and Licensing Inc., Basking Ridge, NJ (US)

(72) Inventors: Jeffrey M. Bloom, Bellingham, MA (US); Alex Iannicelli, Andover, MA (US); Kishore Chitrapu, Shrewsbury, MA (US); Paul M. Curtis, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 210 days.

(21) Appl. No.: 14/035,108

(22) Filed: Sep. 24, 2013

(65) Prior Publication Data
US 2015/0088825 A1 Mar. 26, 2015

(51) Int. Cl.
| G06F 17/30 | (2006.01) |
| G06F 9/50 | (2006.01) |
| G06F 11/14 | (2006.01) |
| G06F 9/455 | (2006.01) |

(52) U.S. Cl.
CPC ............... *G06F 9/45558* (2013.01); *G06F 9/50* (2013.01); *G06F 11/14* (2013.01); *G06F 17/30* (2013.01); *G06F 2009/45579* (2013.01)

(58) Field of Classification Search
CPC .............. G06F 17/30575; G06F 17/30; G06F 9/45558; G06F 9/50; G06F 11/14; G06F 2009/45579
USPC ........... 707/610, 620, 634, E17.005, 999.001, 707/999.102; 709/203; 711/162, 168
See application file for complete search history.

(56) References Cited

U.S. PATENT DOCUMENTS

| 2006/0155778 | A1* | 7/2006 | Sharma et al. | 707/201 |
| 2010/0319004 | A1* | 12/2010 | Hudson et al. | 719/313 |
| 2011/0066668 | A1* | 3/2011 | Guarraci | 707/831 |
| 2012/0203742 | A1* | 8/2012 | Goodman | G06F 11/1469 707/646 |
| 2013/0054518 | A1* | 2/2013 | Anglin | G06F 17/30575 707/610 |
| 2013/0263122 | A1* | 10/2013 | Levijarvi | G06F 11/1415 718/1 |
| 2013/0346573 | A1* | 12/2013 | Hemachandran et al. | 709/223 |
| 2014/0279885 | A1* | 9/2014 | Anantharam et al. | 707/622 |
| 2014/0279905 | A1* | 9/2014 | Muniswamy-Reddy et al. | 707/639 |
| 2014/0380330 | A1* | 12/2014 | Xiao et al. | 718/104 |

OTHER PUBLICATIONS

Dillon et al, "Cloud Computing: Issues and Challenges", 2010 24th IEEE International Conference on Advanced Information Networking and Applications, Apr. 20-23, 2010, pp. 27-33.*

* cited by examiner

*Primary Examiner* — Tony Mahmoudi
*Assistant Examiner* — Kamal Dewan

(57) ABSTRACT

A device may receive agreement information associated with a customer of a cloud computing service. The agreement information may be based on input associated with the customer. The device may generate replication policy information based on the agreement information. The replication policy information may identify multiple replication sets, each including replication information. The device may identify data, associated with the customer, to be stored or processed by a cloud computing resource associated with the cloud computing service. The device may determine the replication set information, associated with each replication set, based on the replication policy information. The replication set information may identify at least one computing resource to store or process the data. The device may forward the data to the at least one computing resource based on the replication set information.

20 Claims, 10 Drawing Sheets

VIRTUAL MACHINE STORAGE REPLICATION SCHEMES

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Customers may buy these computing resources and use the computing resources on an on-demand basis. Cloud computing environments provide services that do not require end-user knowledge of a physical location and configuration of a system that delivers the services.

DETAILED DESCRIPTION

The following detailed description of example implementations refers to the accompanying drawings. The same reference numbers in different drawings may identify the same or similar elements.

A service provider may provide a cloud computing service to a customer. The customer may wish for the service provider to maintain a replicated set of customer data (e.g., a duplicate set of customer data), associated with the cloud computing service, in one or more devices and/or one or more virtual devices. For example, a customer may request that the data, associated with the customer, be replicated in one or more devices for backup purposes, for disaster recovery purposes, or the like. The customer may also wish for the service provider to maintain the replicated set in one or more devices located in a particular geographic location. A management device may coordinate the replication and synchronization of the customer data across multiple devices and/or virtual devices (e.g., when new data is generated, when existing data is modified, when existing data is deleted, etc.). Implementations described herein may allow a cloud storage service provider to manage the replication of customer data, associated with a cloud computing service, to promote cloud computing service reliability, and to prevent a loss of customer data.

Figure 1A:
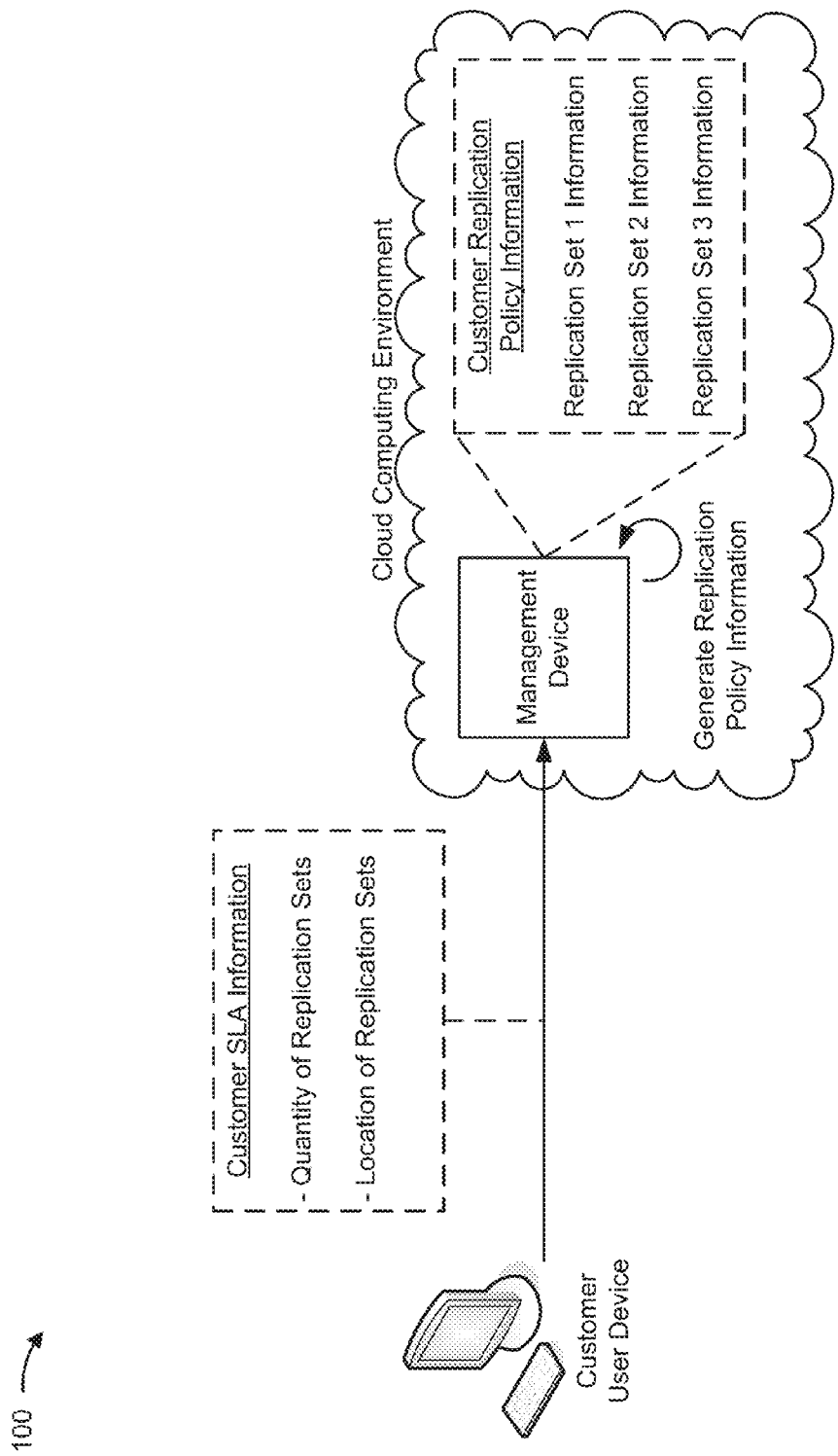
FIGS. 1A and 1B are diagrams of an overview of an example implementation described herein.
Figure 1B:
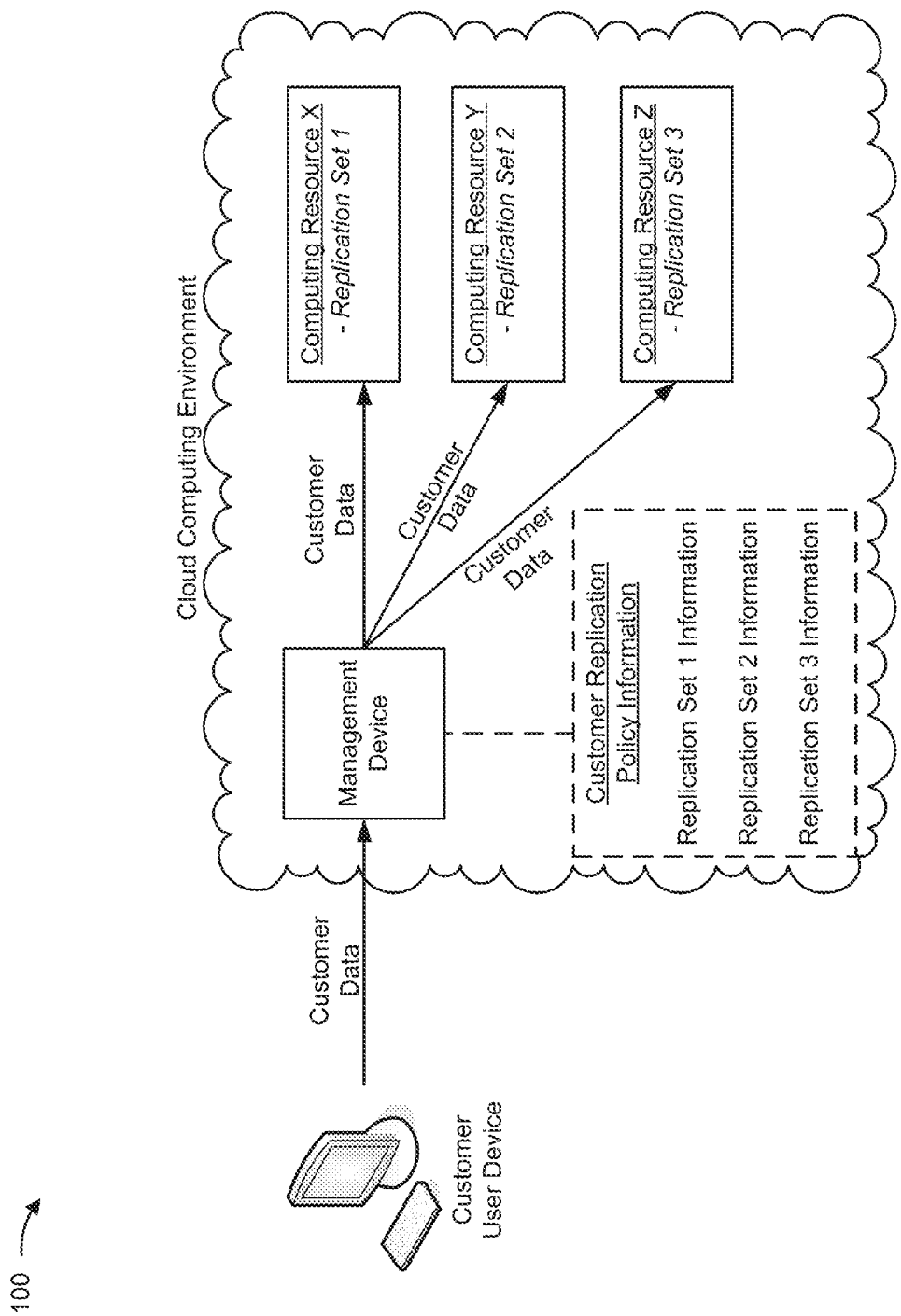

FIGS. 1A and 1B are diagrams of an overview of an example implementation 100 described herein. For the purpose of FIGS. 1A and 1B, assume that a service provider provides a cloud computing service to a customer. Further, assume that the service provider has an agreement (e.g., a service level agreement ("SLA"), etc.) in place with the customer. Finally, assume that the agreement allows for replication of data, associated with the customer, by one or more computing resources associated with the cloud computing service.

As shown in FIG. 1A, a user device, associated with a customer, may provide agreement information (e.g., information associated with an SLA) to a management device associated with the cloud computing service. As shown, the agreement information may include information associated with the replication of customer data (e.g., information identifying a quantity of replication sets, information identifying a location of the replication sets, etc.) that may be processed and/or stored by one or more computing resources associated with the cloud computing service.

As further shown in FIG. 1A, the management device may receive the agreement information from the user device, and may generate replication policy information identifying replication sets associated with the customer. The replication policy information may be based on information associated with a computing resource that may be assigned to process and/or store data associated with the customer. As shown, the replication policy information may include information associated with one or more replication sets that are to be maintained by one or more computing resources associated with the cloud computing service. As further shown in FIG. 1A, assume that the management device generates replication policy information associated with three replication sets. The management device may store the replication policy information, as shown.

As shown in FIG. 1B, assume that the customer user device sends data to be processed and/or stored using the cloud computing service. As shown, the management device may identify the data as being associated with the customer, and may determine (e.g., based on information stored by the management device, etc.) replication policy information associated with the customer. As further shown, assume that the management device determines that three replications sets are to be maintained for data associated with the customer (e.g., replication set 1 is to be maintained by computing resource X, replication set 2 is to be maintained by computing resource Y, and replication set 3 is to be maintained by computing resource Z). As shown in FIG. 1B, the management device may forward the customer data to each computing resource, associated with each replication set, for separate processing and/or storage (e.g., three separate replication sets may be maintained). In this way, a cloud storage service provider may manage the replication of customer data, associated with a cloud computing service, across multiple computing resources associated with the cloud computing service.

Figure 2:
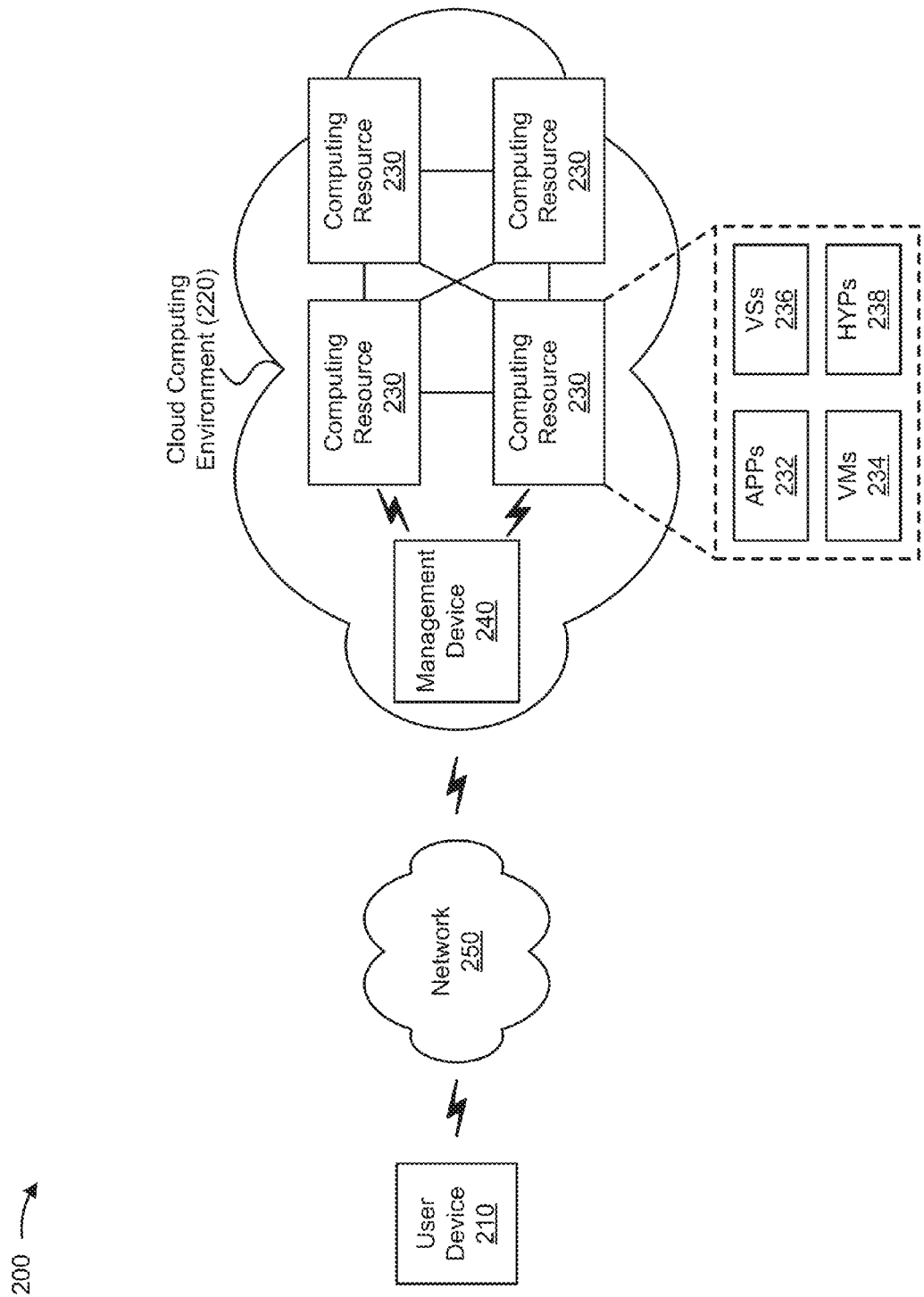
FIG. 2 is a diagram of an example environment in which systems and/or methods described herein may be implemented.

FIG. 2 is a diagram of an example environment 200 in which systems and/or methods described herein may be implemented. As shown, environment 200 may include a user device 210 interconnected with a cloud computing environment 220 via a network 250. Components of environment 200 may interconnect via wired connections, wireless connections, or a combination of wired and wireless connections.

User device 210 may include one or more devices that are capable of communicating with cloud computing environment 220 via network 250. For example, user device 210 may include a laptop computer, a personal computer, a tablet computer, a desktop computer, a workstation computer, a smart phone, a personal digital assistant ("PDA"), and/or another computation or communication device. In some implementations, user device 210 may be associated with a user that receives services from cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as "computing resources 230" and individually as "computing resource 230") and a management device 240.

Computing resource 230 may include one or more personal computers, workstation computers, server devices, or other types of computation or communication devices. In some implementations, computing resource 230 may provide services to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections. In some implementations, one or more computing resources 230 may be assigned (e.g., by a device associated with the cloud computing service provider, etc.) to process and/store data, associated with a customer, in accordance with an agreement (e.g., an SLA agreement). In some implementations, computing resource 230 may be assigned to process and/or store data associated with a replicated set of customer data. In some implementations, computing resource 230 may be assigned to process data based on an attribute of computing resource 230 (e.g., a location of computing resource 230, a processing power of computing resource 230, etc.). In some implementations, computing resource 230 may be assigned to process and/or store customer data based on an availability of computing resource 230 (e.g., a quantity of processing power not yet assigned to process data, etc.).

As further shown in FIG. 2, computing resource 230 may include one or more applications ("APPs") 232, one or more virtual machines ("VMs") 234, virtualized storage ("VSs") 236, one or more hypervisors ("HYPs") 238, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system ("OS"). A process virtual machine may execute a single program, and may support a single process. In some implementations, virtual machine 234 may execute on behalf of a user (e.g., user device 210), and may manage infrastructure of cloud computing environment 220, such as data management, synchronization, or long-duration data transfers.

Virtualized storage 236 may include one or more storage systems and/or one or more devices that use virtualization techniques within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service provided by cloud computing environment 220.

Management device 240 may include a device capable of managing cloud computing environment 220 and/or one or more computing resources 230. For example, management device 240 may include a server, a controller, a gateway, a router, a modem, a switch, a firewall, a network interface card ("NIC"), a hub, a bridge, an optical add/drop multiplexer ("OADM"), or the like. In some implementations, management device 240 may include a device capable of receiving information (e.g., from user device 210) associated with an agreement (e.g., an SLA agreement, etc.), and generating replication policy information based on the agreement. Additionally, or alternatively, management device 240 may include a device capable of identifying, monitoring, forwarding, managing, and/or processing data associated with a customer of a cloud computing service based on the replication policy information. While shown as being located external to computing resource 230, management device 240 may be implemented within one or more computing resources 230 and/or one or more components of computing resource 230 (e.g., application 232, virtual machine 234, virtualized storage 236, hypervisor 238, etc.). Alternatively, management device 240 may be included within another device associated with cloud computing environment 220.

Network 250 may include a network, such as a local area network ("LAN"), a wide area network ("WAN"), a metropolitan area network ("MAN"), a telephone network, such as the Public Switched Telephone Network ("PSTN") or a cellular network, an intranet, the Internet, a fiber-optic based network, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Figure 3:
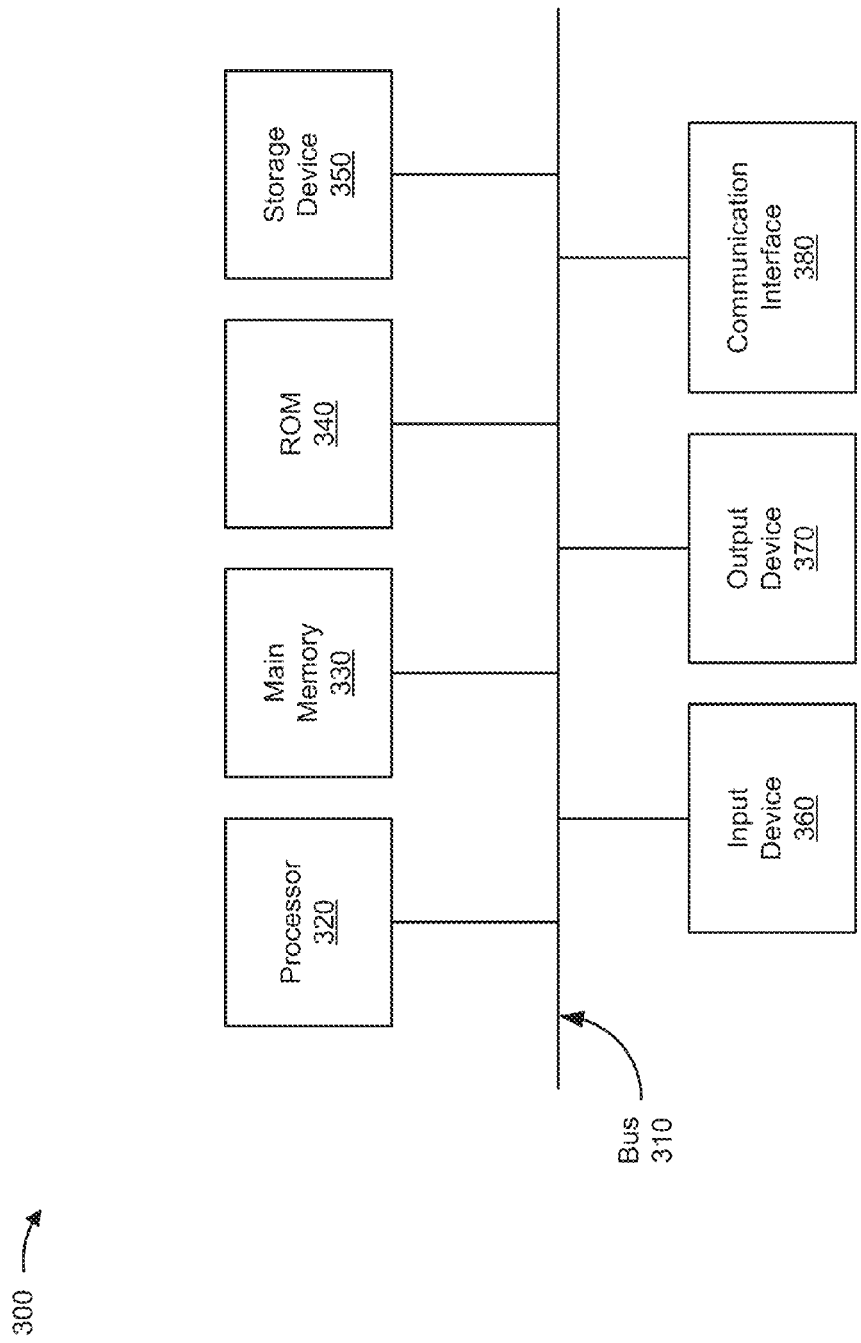
FIG. 3 is a diagram of example components of one or more devices of FIG. 2.

FIG. 3 is a diagram of example components of a device 300 that may correspond to one or more of the devices of environment 200. As shown, device 300 may include a bus 310, a processor 320, a main memory 330, a read-only memory ("ROM") 340, a storage device 350, an input device 360, an output device 370, and/or a communication interface 380. Bus 310 may include a path that permits communication among the components of device 300.

Processor 320 may include one or more processors, microprocessors, application-specific integrated circuits ("ASICs"), field-programmable gate arrays ("FPGAs"), or other types of processors that interpret and execute instructions. Main memory 330 may include one or more random access memories ("RAMs") or other types of dynamic storage devices that store information and/or instructions for execution by processor 320. ROM 340 may include one or more ROM devices or other types of static storage devices that store static information and/or instructions for use by processor 320. Storage device 350 may include a magnetic and/or optical recording medium and a corresponding drive.

Input device 360 may include a component that permits a user to input information to device 300, such as a keyboard, a camera, an accelerometer, a gyroscope, a mouse, a pen, a microphone, voice recognition and/or biometric components, a remote control, a touch screen, a neural interface, etc. Output device 370 may include a component that outputs information from device 300, such as a display, a printer, a speaker, etc. Communication interface 380 may include any transceiver-like component that enables device 300 to communicate with other devices, networks, and/or systems. For example, communication interface 380 may include components for communicating with another device or system via a network.

As described herein, device 300 may perform certain operations in response to processor 320 executing software instructions contained in a computer-readable medium, such as main memory 330. A computer-readable medium may be defined as a non-transitory memory device. A memory device may include memory space within a single physical memory device or memory space spread across multiple physical memory devices. The software instructions may be read into main memory 330 from another computer-readable medium, such as storage device 350, or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Figure 4:
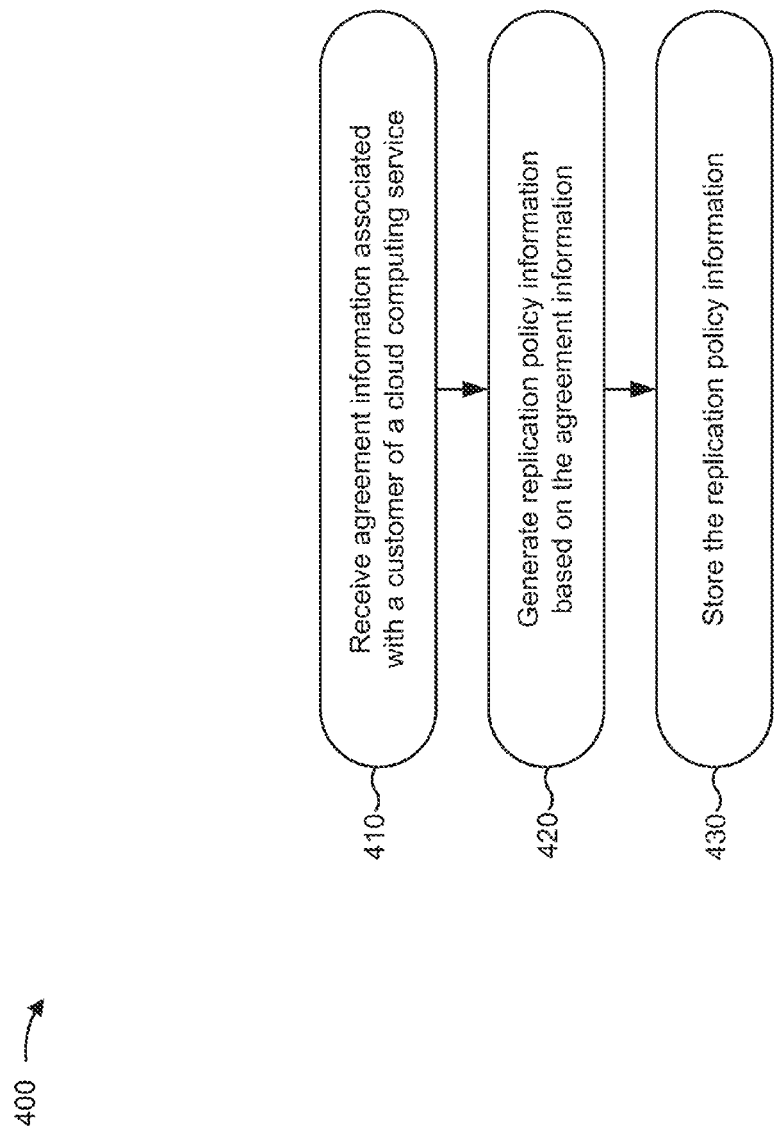
FIG. 4 is a flow chart of an example process for generating and storing replication policy information associated with a customer of a cloud computing service.

FIG. 4 is a flow chart of an example process 400 for generating and storing replication policy information associated with a customer of a cloud computing service. In some implementations, one or more process blocks of FIG. 4 may be performed by management device 240. In some implementations, one or more process blocks of FIG. 4 may be performed by another device or a group of devices separate from or including management device 240, such as computing resource 230 and/or user device 210.

As shown in FIG. 4, process 400 may include receiving agreement information associated with a customer of a cloud computing service (block 410). For example, management device 240 may receive (e.g., from user device 210) agreement information (e.g., information associated with an SLA, etc.) associated with a customer of the cloud computing service. Additionally, or alternatively, management device 240 may receive the agreement information from another device associated with the customer and/or cloud computing environment 220.

Agreement information, as used herein, may include information associated with an agreement between a cloud computing service provider and a customer of the cloud computing service provider. In some implementations, the agreement information may include information associated with a replication scheme. The replication scheme may include information associated with replicating customer data (e.g., for backup purposes, for disaster recovery purposes, etc.). For example, the replication scheme may identify a quantity of replication sets (e.g., a quantity of duplicate data sets, a quantity of duplicate virtual devices, etc.), a location associated with the replication scheme (e.g., a data center where a replicated virtual machine is to be established, a geographic location where a replicated data set is to be maintained, etc.), or the like. In some implementations, the agreement information may be based on information provided (e.g., via user device 210) by the customer associated with the agreement information.

As further shown in FIG. 4, process 400 may include generating replication policy information based on the agreement information (block 420). For example, management device 240 may generate replication policy information based on agreement information received from a device associated with a customer of the cloud computing service (e.g., user device 210).

In some implementations, management device 240 may generate the replication policy information when management device 240 receives (e.g., from user device 210) the agreement information. Additionally, or alternatively, management device 240 may generate the replication policy information when management device 240 identifies data associated with the customer. Additionally, or alternatively, management device 240 may generate the replication policy information based on receiving (e.g., from user device 210 and/or a device associated with cloud computing environment 220) updated agreement information.

In some implementations, management device 240 may generate the replication policy information based on receiving input (e.g., provided via user device 210) associated with the customer. For example, management device 240 may determine one or more replication options associated with replicating the data (e.g., a geographic location where a replication set may be maintained, etc.), and management device 240 may provide (e.g., via a display screen of user device 210) the replication options (e.g., in the form of a list) to the customer. The customer may then select (e.g., via user device 210) the desired replication options, and the customer selection may be provided to management device 240. Management device 240 may then generate the replication policy information based on receiving the customer selection.

Replication policy information, as used herein, may include information associated with a replication set of customer data that is to be processed and/or stored using the cloud computing service. For example, the replication policy information may include information indicating a replication set identifier (e.g., a string of characters that identifies the replication set, a replication set identification number, etc.), information identifying a location of the replication set (e.g., a geographic location, a data center, a chassis, a rack, etc.), a computing resource 230 associated with the replication set (e.g., a device assigned to process and/or store the replicated data associated with the customer, etc.), or the like. In some implementations, the replication policy information may include information associated with one or more replication sets associated with customer data. In some implementations, the replication policy information may be generated based on the agreement information received from user device 210. Additionally, or alternatively, the replication policy information may be generated based on information (e.g., received from a device associated with cloud computing environment 220) identifying a computing resource 230 that is to process and/or store the replication set associated with the customer. Additionally, or alternatively, the replication policy information may be generated based on information associated with a default replication set (e.g., when agreement information, associated with the customer, is not available, when the agreement information specifies the default replication set, etc.).

As further shown in FIG. 4, process 400 may include storing the replication policy information (block 430). For example, management device 240 may store the replication policy information in a data structure. In some implementations, management device 240 may store information associated with the replication policy information, such as a customer identifier (e.g., a string of characters, etc.), that identifies the customer associated with the replication policy information. In some implementations, management device 240 may store the replication policy information in a memory location (e.g., a RAM, a hard disk, etc.) of management device 240, and management device 240 may store an indication that the replication policy information is associated with user device 210, a user of user device 210, a customer associated with user device 210, and/or computing resource 230. Additionally, or alternatively, management device 240 may transmit the replication policy information to another device (e.g., to user device 210, to computing resource 230, etc.) for storage.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel. Further, one or more blocks of process 400 may be omitted in some implementations.

Figure 5:
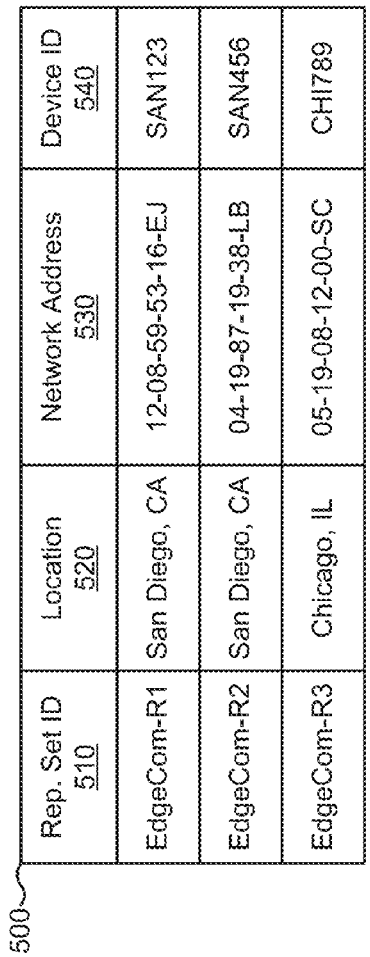
FIG. 5 is a diagram of an example data structure that stores replication policy information associated with a customer.

FIG. 5 is a diagram of an example data structure 500 that stores replication policy information associated with a customer. Data structure 500 may be stored in a memory device (e.g., a RAM, a hard disk, etc.) associated with one or more devices and/or components of FIGS. 2 and/or 3. For example, data structure 500 may be stored by management device 240, computing resource 230, and/or user device 210.

As shown in FIG. 5, data structure 500 may include a collection of fields, such as a replication set identifier field 510, a location field 520, a network address field 530, and a device identifier field 540.

Replication set identifier field 510 may store information that identifies a replication set associated with a customer of the cloud computing service. For example, replication set identifier field 510 may store information identifying a replication set using a string of characters associated with a customer name (e.g., EdgeCom), a string of characters associated with a replication set number, (e.g., R1), a string of characters associated with a combination of the customer name and the replication set number (e.g., EdgeCom-R1), or the like.

Location field 520 may store information that identifies a location associated with the replication set identified by replication set identifier field 510. For example, location field 520 may store information identifying a geographic location (e.g., San Diego, Calif.), a data center, a chassis housing a computing resource 230, a rack including a set of computing resources 230, or the like. In some implementations, the location identified in location field 520 may indicate where the replication set, identified in replication set identifier field 510, is to be processed and/or stored. In some implementations, the information stored in location field 520 may be based on input, provided by the customer, associated with the replication set identified in replication set identifier field 510 (e.g., the customer may specify a location for processing and/or storage of the replication set).

Network address field 530 may store information that identifies a network address associated with the replication set identified in replication set identifier field 510. For example, network address field 530 may store information identifying a network address (e.g., 12-08-59-53-16-EJ) associated with a computing resource 230 (e.g., a computing resource 230 physically located at the location identified in location field 520) that may process and/or store the replication set identified in replication set identifier field 510. In some implementations, the information stored in network address field 530 may be based on information associated with computing resource 230 (e.g., information indicating that computing resource 230 is assigned to process and/or store data associated with the customer, etc.). Additionally, or alternatively, the information stored in network address field 530 may be based on information associated with user input (e.g., input indicating that a replication set is to be processed and/or stored at the location identified in location field 520, etc.).

Device identifier field 540 may store information that identifies a device associated with processing and/or storing the replication set identified in replication set identifier field 510. For example device identifier field 540 may store information identifying a computing resource 230 and/or information identifying a virtual device (e.g., an application 232, a virtual machine 234, a virtual storage 236, a hypervisor 238, etc.) associated with processing and/or storing the replication set identified in replication set identifier field 510. In some implementations, the information stored in device identifier field 540 may be based on information associated with computing resource 230 (e.g., information indicating that computing resource 230 is assigned to process and/or store data associated with the customer, etc.). In some implementations, the information stored in device identifier field 540 may be based on information stored in network address field 530 (e.g., where a virtual device is associated with a network address, etc.). Additionally, or alternatively, the information stored in device identifier field 540 may be based on information associated with user input (e.g., input indicating that a replication set is to be processed and/or stored at the location identified in location field 520, input indicating that a replication set is to be processed and/or stored by a device associated with the network address stored in network address field 530 or associated with the device identified in device identifier field 510, etc.).

Replication policy information, associated with a customer, may be conceptually represented as a group of rows in data structure 500. For example, the first row in data structure 500 may correspond to replication policy information associated with a first replication set of data associated with a customer, identified as EdgeCom. As shown, the first Edge-Com replication set may be identified as EdgeCom-R1. The EdgeCom-R1 replication set may be processed and/or stored at a data center (e.g., a data center associated with the cloud computing service) located in San Diego, Calif., and may be processed and/or stored by a computing resource associated with a network address of 12-08-59-53-16-EJ. Finally, a device (e.g., a virtual device associated with computing resource 230) identified as SAN123 may be assigned to process and/or store customer data associated with the Edge-Com-R1 replication set.

As shown, the second row of data structure 500 may store information associated with a second EdgeCom replication set, identified as EdgeCom-R2. The EdgeCom-R2 replication set may also be processed and/or stored at the data center located in San Diego, Calif., and may be processed and/or stored by a computing resource associated with a network address of 04-19-87-19-38-LB. Finally, a device identified as SAN456 may be assigned to process and/or store customer data associated with the EdgeCom-R2 replication set.

As further shown in FIG. 5, the third row of data structure 500 may store information associated with a third EdgeCom replication set, identified as EdgeCom-R3. The EdgeCom-R3 replication set may be processed and/or stored at a data center located in Chicago, Ill., and may be processed and/or stored by a computing resource associated with a network address of 05-19-08-12-00 SC. Finally, a device identified as CHI789 may be assigned to process and/or store customer data associated with the EdgeCom-R3 replication set.

Data structure 500 includes fields 510-540 for explanatory purposes. In practice, data structure 500 may include additional fields, fewer fields, different fields, or differently arranged fields than those shown in FIG. 5 and/or described herein with respect to data structure 500. Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or a component. Additionally, or alternatively, data structure 500 may include information provided from another source, such as information provided by a user and/or information automatically provided by a device.

Figure 6A:
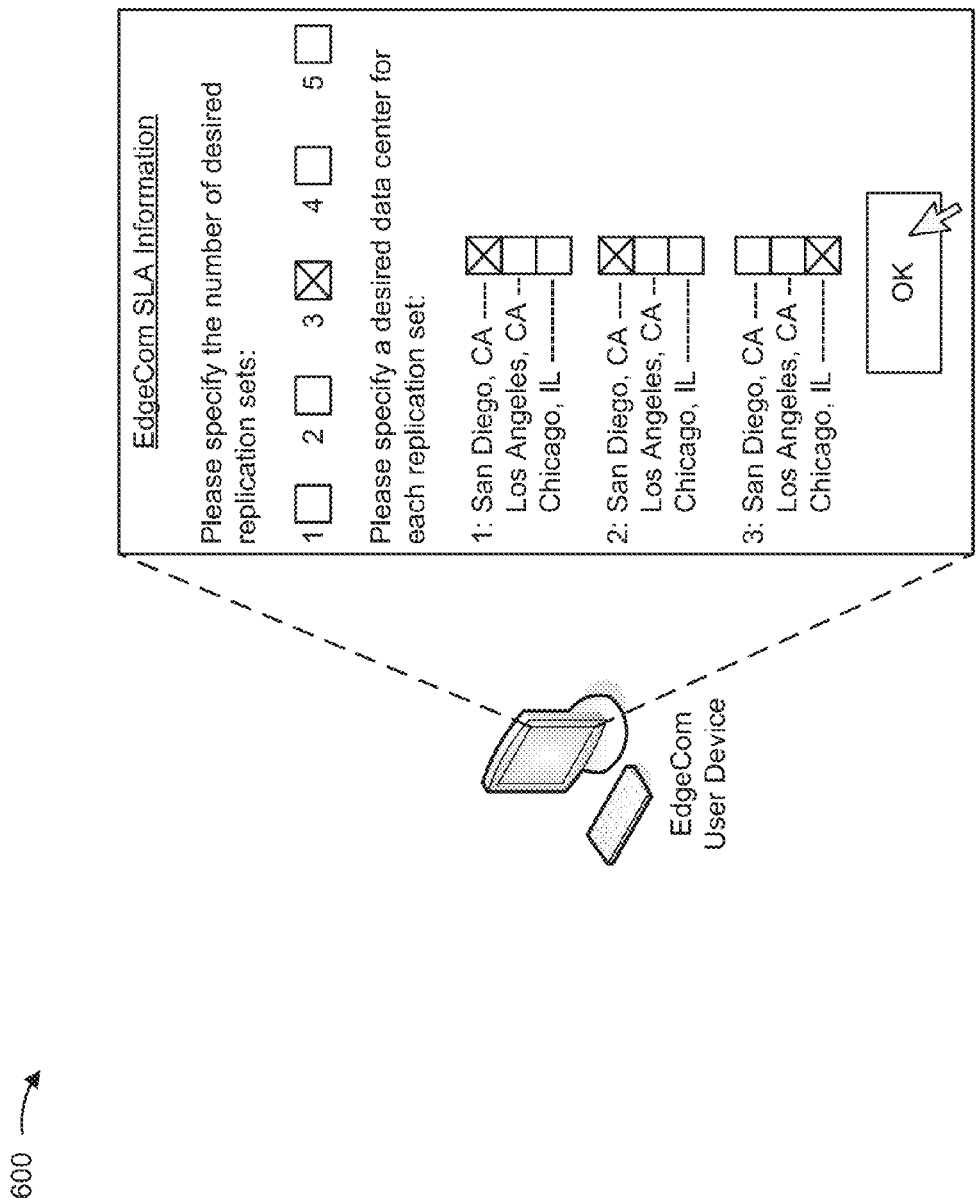
FIGS. 6A and 6B are diagrams of an example implementation relating to the example process shown in FIG. 4.
Figure 6B:
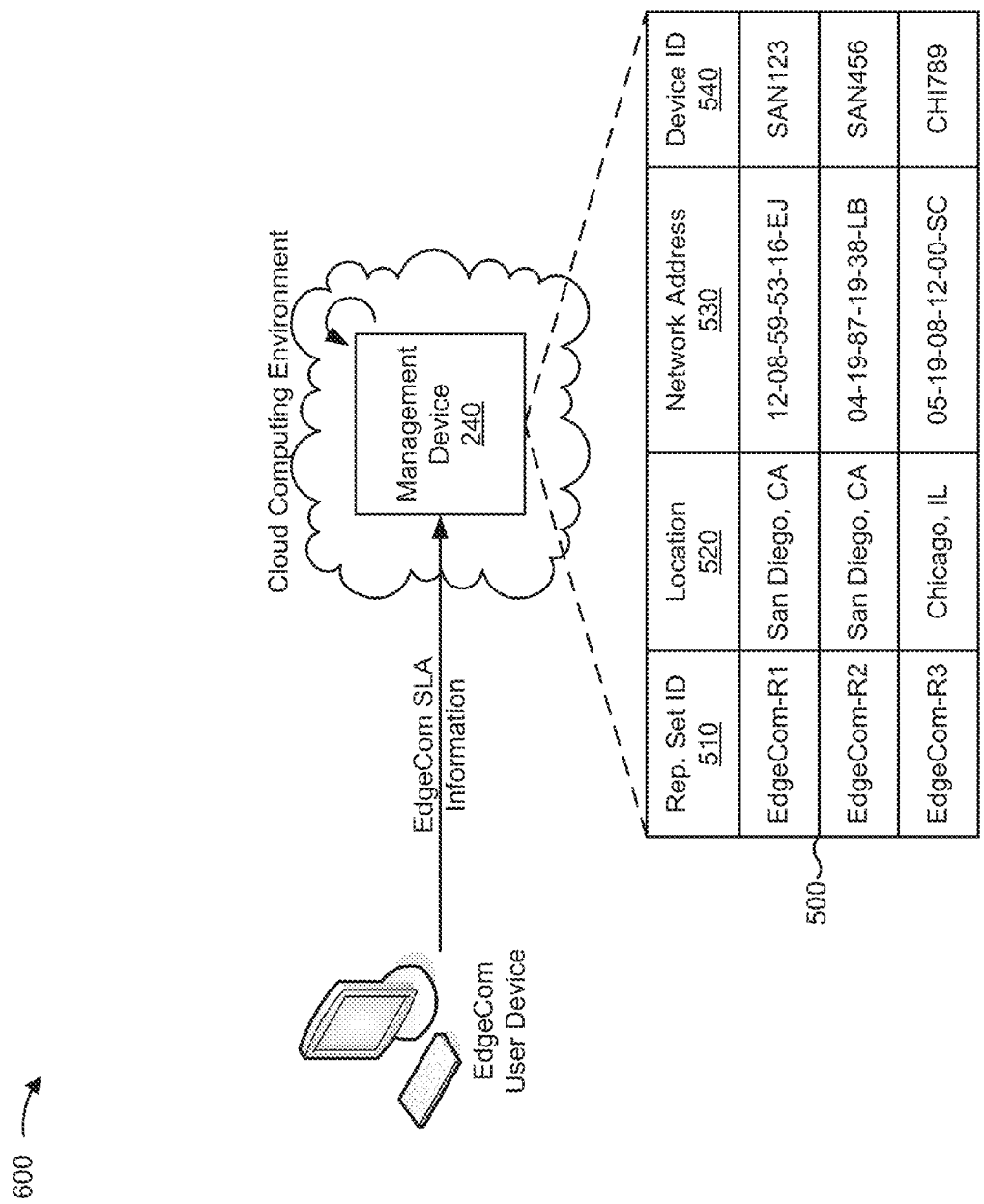

FIGS. 6A and 6B are diagrams of an example implementation 600 relating to example process 400 shown in FIG. 4. For the purpose of example implementation 600, assume that EdgeCom is a customer of a cloud computing service. Further, assume that EdgeCom has entered into an SLA with the cloud computing service provider that allows for the replication of data associated with EdgeCom.

As shown in FIG. 6A, a user of a user device, associated with EdgeCom, may interact with a user interface displayed on a display screen of the EdgeCom user device to provide information associated with an SLA. The information displayed by the EdgeCom user device may be based on information received from management device 240 (e.g., management device 240 may determine information associated with one or more locations where a replication set may be maintained, and management device 240 may provide the information to the EdgeCom user device).

As shown, the user may interact with input element (e.g., a checkbox, etc.) to indicate that three replication sets of customer data, associated with EdgeCom, are to be maintained by the cloud computing service. The user may also interact with an input element (e.g., a checkbox, etc.) to indicate a geographic location where each replication set is to be maintained. As shown, the user may provide input indicating that a first replication set and a second replication set are to be maintained in a data center (e.g., a data center associated with the cloud computing service) located in San Diego, Calif. As also shown, the user may provide input indicating that a third replication set is to be maintained in a data center located in Chicago, Ill. The user may confirm the quantity of replication sets and the location of each replication set (e.g., by clicking an "OK" button, etc.).

As shown in FIG. 6B, the EdgeCom user device may send the EdgeCom SLA information to management device 240 when the user has selected and confirmed the information associated with the EdgeCom replication sets (e.g., the quantity of replication sets, the location of each replication set, etc.). As shown, management device 240 may receive the SLA agreement information, and management device 240 may generate replication policy information associated with EdgeCom based on the SLA agreement information received from the EdgeCom user device. The network address and the device identifier may be determined based on information associated with a computing resource 230 that may be assigned to process and/or store data associated with Edge-Com. For example, computing resource 230 may be located in a geographic location indicated by the customer.

As further shown in FIG. 6B, the replication policy information may indicate that a first replication set, identified as EdgeCom-R1, is to be maintained in a data center located in San Diego, Calif. The EdgeCom-R1 replication set may be maintained by a computing resource associated with a network address of 12-08-59-53-16-EJ and may be processed and/or stored by a device identified as SAN123. The replication policy may also indicate that a second replication set, identified as EdgeCom-R2, is to be maintained in the data center located in San Diego, Calif. The EdgeCom-R2 replication set may be maintained by a computing resource associated with a network address of 04-19-87-19-38-LB and may be processed and/or stored by a device identified as SAN456. Finally, the replication policy may also indicate that a third replication set, identified as EdgeCom-R3, is to be maintained in a data center located in Chicago, Ill. The EdgeCom-R3 replication set may be maintained by a computing resource associated with a network address of 05-19-08-12-00-SC and may be processed and/or stored by a device identified as CHI789. As shown, the replication policy information may be stored by management device 240 in data structure 500.

As indicated above, FIGS. 6A and 6B are provided merely as an example. Other examples are possible and may differ from what was described with regard to FIGS. 6A and 6B.

Figure 7:
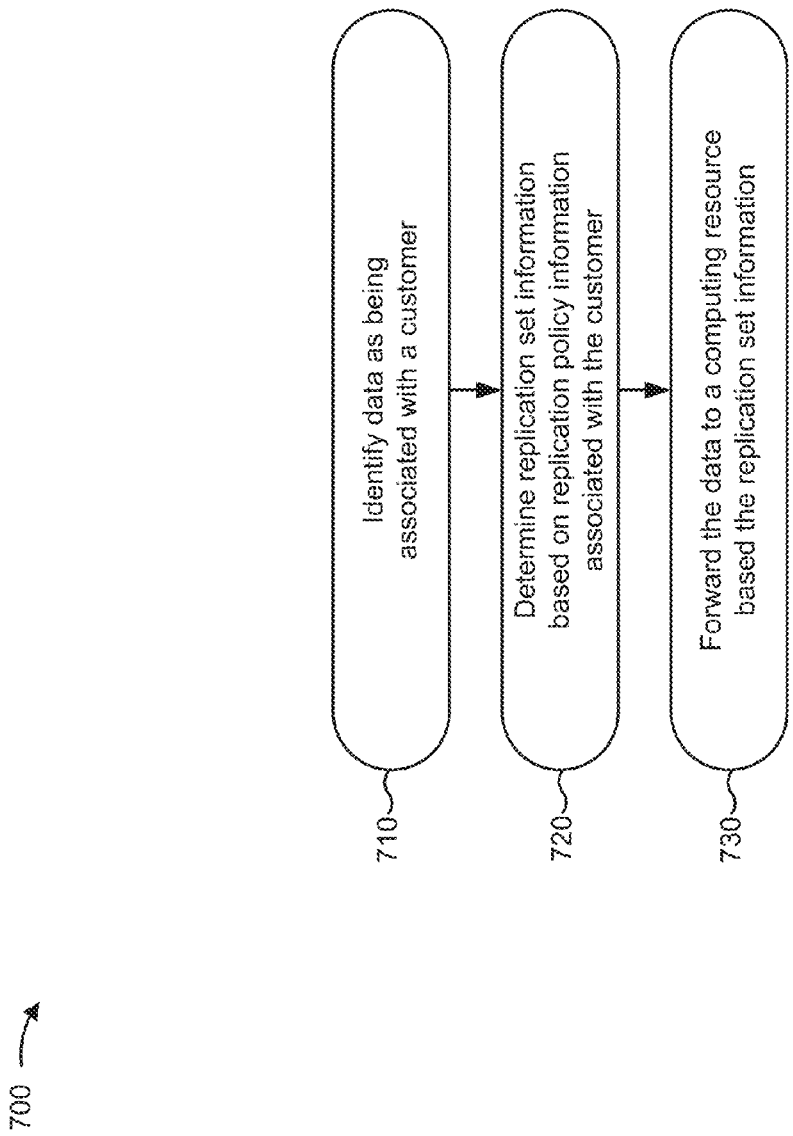
FIG. 7 is a flow chart of an example process for forwarding data, associated with a customer, to a computing resource based on replication set information.

FIG. 7 is a flow chart of an example process 700 for forwarding data, associated with a customer, to a computing resource based on replication set information. In some implementations, one or more process blocks of FIG. 7 may be performed by management device 240. In some implementations, one or more process blocks of FIG. 7 may be performed by another device or a group of devices separate from or including management device 240, such as computing resource 230 and/or user device 210.

As shown in FIG. 7, process 700 may include identifying data as being associated with a customer (block 710). For example, management device 240 may identify data as being associated with a customer of a cloud computing service when the data is received from user device 210. In some implementations, management device 240 may identify the data as being associated with the customer based on receiving agreement information associated with the customer (e.g., based on SLA agreement information received by management device 240). Additionally, or alternatively, management device 240 may identify the data based on information associated with the contents of the data (e.g., a customer identifier included within a packet header, etc.). Additionally, or alternatively, management device 240 may identify the data based on information associated with user device 210 from which the data originated (e.g., an internet protocol ("IP") address of user device 210 that is known to be associated with a customer, etc.). Additionally, or alternatively, management device 240 may identify the data based on information associated with user of user device 210 (e.g., login information, associated with the user, used to access the cloud computing service, etc.). Additionally, or alternatively, management device 240 may identify the data based on information associated with a computing resource 230 to which the data is being sent.

As shown in FIG. 7, process 700 may include determining replication set information based on replication policy information associated with the customer (block 720). For example, management device 240 may determine replication set information (e.g., a replication set identifier, a location for processing and/or storage of a replication set, a network address associated with a replication set, a device identifier associated with a replication set, etc.) based on replication policy information, associated with the customer, stored by management device 240. In some implementations, the replication set information may be included in data structure 500 stored by management device 240 and/or another device (e.g., computing resource 230). Additionally, or alternatively, management device 240 may determine the replication set information based on information received from another device associated with the customer and/or cloud computing environment 220. In some implementations, management device 240 may determine one or more sets of replication set information based on the replication policy information stored by management device 240.

As shown in FIG. 7, process 700 may include forwarding the data to a computing resource based on the replication set information (block 730). For example, management device 240 may forward the data to computing resource 230 based on the replication set information associated with the customer. In some implementations, management device 240 may forward the customer data to one or more computing resources 230 and/or one or more devices based on replication policy information (e.g., a network address, a device identifier, etc.) stored by management device 240. In some implementations, the data may be forwarded to allow for processing and/or storage of the data by a computing resource 230 assigned to maintain the replication set. In some implementations, the data may be forwarded to multiple computing resources 230 assigned to maintain the replication set. Additionally, or alternatively, the data may be forwarded to a single computing resource 230, and the computing resource 230 may forward the data to one or more additional computing resources 230.

Although FIG. 7 shows example blocks of process 700, in some implementations, process 700 may include additional blocks, different blocks, fewer blocks, or differently arranged blocks than those depicted in FIG. 7. Additionally, or alternatively, one or more of the blocks of process 700 may be performed in parallel. Further, one or more blocks of process 700 may be omitted in some implementations.

Figure 8:
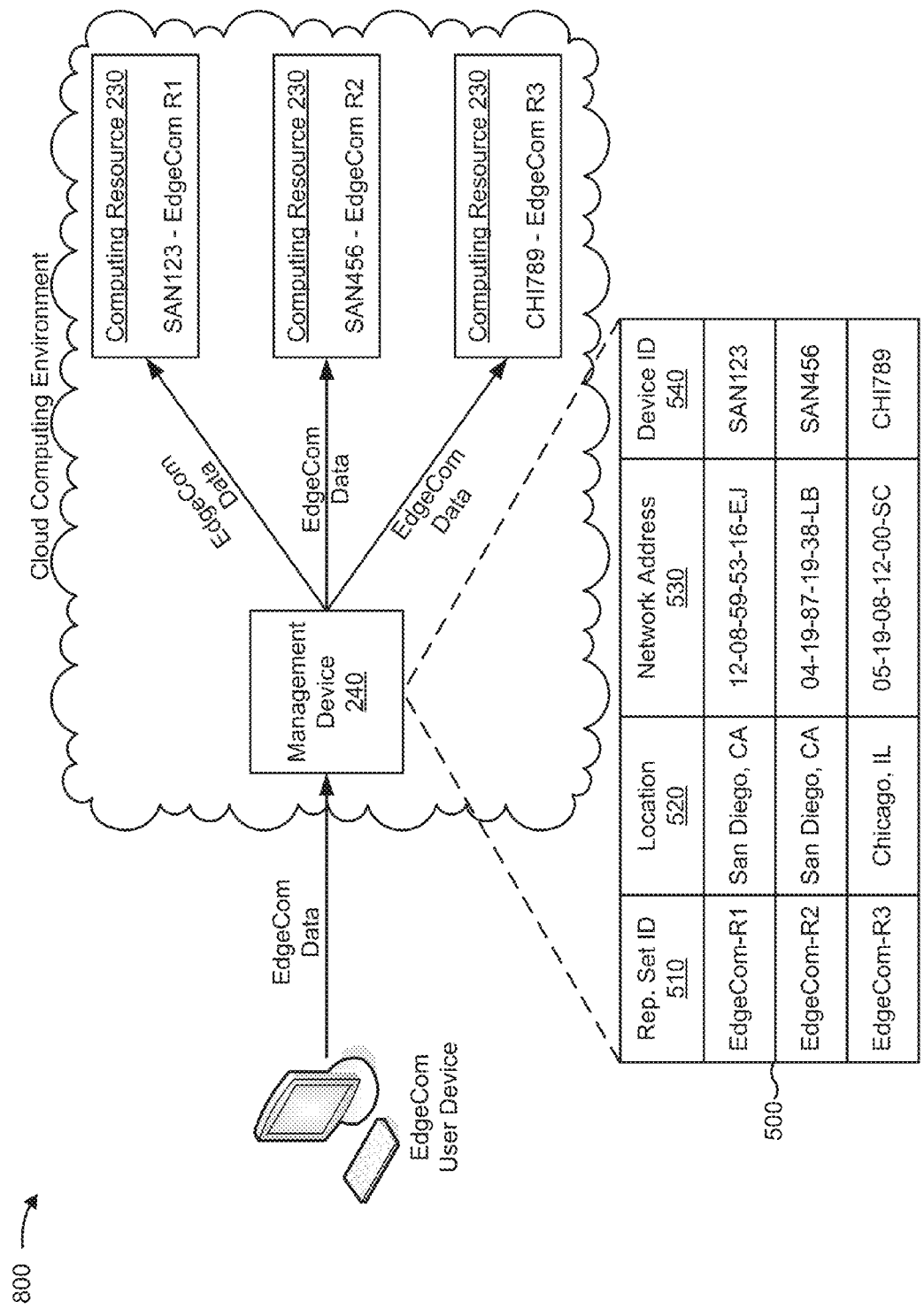
FIG. 8 is a diagram of an example implementation relating to the example process shown in FIG. 7.

FIG. 8 is a diagram of an example implementation 800 relating to example process 700 shown in FIG. 7. For the purpose of example implementation 800, assume that Edge-Com is a customer of a cloud computing service provider, and that EdgeCom has entered into an SLA with the cloud computing service provider. Further, assume that replication policy information, associated with the EdgeCom SLA, has been generated and is stored by management device 240. Finally, assume that a number of computing resources 230 have been assigned to process and/or store the data associated with the EdgeCom.

As shown in FIG. 8, a user device associated with Edge-Com may access the cloud computing service, and may send data to management device 240. As shown, management device 240 may identify the data as being associated with EdgeCom based on information associated with the user device (e.g., a known IP address associated with the Edge-Com user device).

As further shown in FIG. 8, management device 240 may determine replication set information for the data associated with EdgeCom based on replication policy information stored by management device 240. As shown, management device 240 may determine that three replication sets of the EdgeCom data are to be maintained by the cloud computing service.

As shown, the replication set information may indicate that a first replication set, EdgeCom-R1, is to be maintained in a San Diego, Calif. data center by a computing resource associated with a network address of 12-08-59-53-16-EJ, and may indicate that the data is to be processed and/or stored by a device identified as SAN123. Additionally, the replication set information may indicate that a second replication set, Edge-Com-R2, is to be maintained in the data center located in San Diego, Calif. by a computing resource associated with a network address of 04-19-87-19-38-LB, and may indicate that the data is to be processed and/or stored by a device identified as SAN456. Finally, the replication set information may indicate that a replication set, EdgeCom-R3, is to be maintained in a data center located in Chicago, Ill. by a computing resource associated with a network address of 05-19-08-12-00-SC, and may indicate that the data is to be processed and/or stored by a device identified as CHI789.

As further shown in FIG. 8, management device 240 may forward the EdgeCom data to three computing resources 230 (e.g., the three computing resources 230 where the three devices, identified by the replication policy information, are located) based on information associated with each replication set. Each device (e.g., each device identified by the replication set information) may process and/or store the Edge-Com data to maintain a replication set of the EdgeCom data in each location.

As indicated above, FIG. 8 is provided merely as an example. Other examples are possible and may differ from what was described with regard to FIG. 8.

Implementations described herein may allow a cloud storage service provider to manage the replication of customer data across one or more computing resources associated with the cloud computing service (e.g., for backup purposes, for disaster recovery purposes, etc.).

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations shown in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

As used herein, the term component is intended to be broadly construed as hardware, firmware, or a combination of hardware and software.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      determine one or more replication options associated with replicating data associated with a user of a cloud computing service,
         each of the one or more replication options corresponding to one or more geographic locations associated with the cloud computing service,
         the one or more geographic locations being determined to be appropriate for replicating the data associated with the user; provide information that identifies the one or more replication options,
         the information that identifies the one or more replication options being provided for display via a user interface;
      receive, via the user interface, a selected replication option of the one or more replication options;
      receive agreement information associated with the user of the cloud computing service,
         the agreement information including information that identifies one or more selected geographic locations where the data associated with the user is to be stored or processed,
         the one or more selected geographic locations being specified based on an interaction, by the user, with the user interface;
      generate replication policy information, associated with the user, based on the selected replication option and based on the agreement information,
         the replication policy information identifying a plurality of computing resources, corresponding to a plurality of geographic locations, where the data associated with the user is to be stored or processed,
         the plurality of geographic locations including the one or more selected geographic locations;
      receive updated agreement information associated with the user of the cloud computing service;
      generate updated replication policy information based on the updated agreement information,
         the updated replication policy information identifying the plurality of computing resources and a particular computing resource, corresponding to a particular geographic location, where the data associated with the user is to be stored or processed;
      receive particular data to be stored or processed by the cloud computing service;
      determine that the particular data is associated with the user;
      identify the updated replication policy information, associated with the user, based on determining that the particular data is associated with the user;
      determine, based on identifying the updated replication policy information associated with the user, the particular computing resource and the plurality of computing resources to store or process the particular data; and
      forward the particular data to the particular computing resource and the plurality of computing resources based on determining the particular computing resource and the plurality of computing resources.

2. The device of claim 1, where the one or more processors are further to:
   determine information associated with a default replication policy; and
   where the one or more processors, when generating the replication policy information, are to:
      generate the replication policy information based on the information associated with the default replication policy.

3. The device of claim 1, where the replication policy information identifies at least one of:
   a replication set identifier;
   a geographic location associated with a replication set;
   a computing resource associated with a replication set;
   a network address associated with a replication set; or
   a virtual device associated with a replication set.

4. The device of claim 1, where the one or more processors are further to:
   receive input, associated with the user, identifying a quantity of replication sets; and
   where the one or more processors, when forwarding the particular data to the particular computing resource and the plurality of computing resources, are to:
      forward the particular data to the particular computing resource and a particular quantity of the plurality of computing resources,
         the particular quantity corresponding to the quantity of replication sets.

5. A non-transitory computer-readable medium storing instructions, the instructions comprising:
   one or more instructions that, when executed by one or more processors, cause the one or more processors to:
      determine one or more replication options associated with replicating data associated with a user of a cloud computing service,
         each of the one or more replication options corresponding to one or more geographic locations associated with the cloud computing service,
         the one or more geographic locations being determined to be appropriate for replicating the data associated with the user;
      provide information that identifies the one or more replication options,
         the information that identifies the one or more replication options being provided for display via a user interface;
      receive, via the user interface, a selected replication option of the one or more replication options;

receive agreement information associated with the user,
the agreement information being received based on
input, provided by the user, that identifies one or more
selected geographic locations where the data associated with the user is to be stored or processed,
the one or more selected geographic locations being
selected from the one or more geographic locations;
generate replication policy information, associated with
the user, based on the selected replication option and
based on the agreement information,
the replication policy information identifying one or
more computing resources, corresponding to the one
or more selected geographic locations, where the data
associated with the user is to be stored or processed;
receive updated agreement information associated with
the user of the cloud computing service;
generate updated replication policy information based
on the updated agreement information,
the updated replication policy information identifying
the one or more computing resources and a particular
computing resource, corresponding to a particular
geographic location, where the data associated with
the user is to be stored or processed;
identify the data, associated with the user, to be stored or
processed by the one or more computing resources
and the particular computing resource;
determine the updated replication policy information
based on identifying the data; and
forward the data to the one or more computing resources
and the particular computing resource based on the
updated replication policy information.

6. The computer-readable medium of claim 5, where the one or more instructions, when executed by the one or more processors, further cause the one or more processors to:
determine information associated with a default replication policy; and
where the one or more instructions, that cause the one or more processors to generate the replication policy information, cause the one or more processors to:
generate the replication policy information based on the information associated with the default replication policy.

7. The computer-readable medium of claim 5, where the one or more instructions, that cause the one or more processors to identify the data to be stored or processed by the one or more computing resources and the particular computing resource, cause the one or more processors to:
receive the data from a user device associated with the user.

8. The computer-readable medium of claim 5, where the one or more instructions, when executed by the one or more processors, further cause the one or more processors to:
receive input, associated with the user, identifying a quantity of replication sets; and
where the one or more instructions, that cause the one or more processors to forward the data to the one or more computing resources and the particular computing resource, cause the one or more processors to:
forward the data to the particular computing resource and a particular quantity of the one or more computing resources,
the particular quantity corresponding to the quantity of replication sets.

9. A method, comprising:
determining, by a device, one or more replication options associated with replicating data associated with a user of a cloud computing service,
each of the one or more replication options corresponding to one or more geographic locations associated with the cloud computing service,
the one or more geographic locations being determined to be appropriate for replicating the data associated with the user;
providing, by the device, information that identifies the one or more replication options,
the information that identifies the one or more replication options being provided for display via a user interface;
receiving, by the device and via the user interface, a selected replication option of the one or more replication options;
receiving, by the device and based on a user interaction with the user interface, agreement information associated with the user,
the agreement information including information that identifies one or more selected geographic locations, of the one or more geographic locations, based on the user interaction;
generating, by the device, replication policy information, associated with the user, based on the selected replication option and based on the agreement information,
the replication policy information identifying one or more computing resources corresponding to the one or more selected geographic locations;
receiving, by the device, updated agreement information associated with the user of the cloud computing service;
generating, by the device, updated replication policy information based on the updated agreement information,
the updated replication policy information identifying the one or more computing resources and a particular computing resource, corresponding to a particular geographic location, where the data associated with the user is to be stored or processed;
identifying, by the device, particular data to be stored or processed by the one or more computing resources and the particular computing resource,
the particular data being associated with the user;
determining, by the device, the updated replication policy information based on identifying the particular data; and
forwarding, by the device, the particular data to the one or more computing resources and the particular computing resource based on the updated replication policy information.

10. The method of claim 9, further comprising:
determining information associated with a default replication policy; and
where generating the replication policy information comprises:
generating the replication policy information based on the information associated with the default replication policy.

11. The method of claim 9, further comprising:
receiving input, associated with the user, identifying a quantity of replication sets; and
where forwarding the particular data to the one or more computing resources and the particular computing resource comprises:
forwarding the particular data to the particular computing resource and a particular quantity of the one or more computing resources,
the particular quantity corresponding to the quantity of replication sets.

12. The device of claim 1, where the one or more processors, when providing the information that identifies the one or more replication options, are to:

receive information that identifies a quantity of replication sets associated with replicating the data associated with the user;

determine the one or more geographic locations based on the quantity of replication sets; and provide the information that identifies the one or more replication options based on determining the one or more geographic locations.

13. The device of claim 12, where the one or more processors, when receiving the information that identifies the quantity of replication sets, are to:

provide, via the user interface, one or more replication sets as a list; and receive the information that identifies the quantity of replication sets based on user selections from the list.

14. The device of claim 1, where the one or more processors, when determining that the particular data is associated with the user, are to:

determine that the particular data is associated with the user based on login information, associated with the user, used to access the cloud computing service.

15. The computer-readable medium of claim 5, where the one or more instructions, that cause the one or more processors to provide the information that identifies the one or more replication options, cause the one or more processors to:

receive information that identifies a quantity of replication sets associated with replicating the data associated with the user; and provide the information that identifies the one or more replication options based on the quantity of replication sets.

16. The computer-readable medium of claim 15, where the one or more instructions, that cause the one or more processors to receive the information that identifies the quantity of replication sets, cause the one or more processors to:

provide, via the user interface, one or more replication sets as a list; and receive the information that identifies the quantity of replication sets based on user selections from the list.

17. The computer-readable medium of claim 5, where the one or more instructions, that cause the one or more processors to determine the updated replication policy information, cause the one or more processors to:

determine that the data is associated with the user; and determine the updated replication policy information based on determining that the data is associated with the user.

18. The method of claim 9, where providing the information that identifies the one or more replication options comprises:

receiving information that identifies a quantity of replication sets associated with replicating the data associated with the user; and providing the information that identifies the one or more replication options based on the quantity of replication sets.

19. The method of claim 18, where receiving the information that identifies the quantity of replication sets comprises:

providing, via the user interface, one or more replication sets as a list; and receiving the information that identifies the quantity of replication options sets based on user selections from the list.

20. The method of claim 9, where determining the updated replication policy information comprises:

determining that the particular data is associated with the user based on login information, associated with the user, used to access the cloud computing service; and determining the update replication policy information based on determining that the particular data is associated with the user.

* * * * *